US008406775B2

(12) United States Patent
Ahn et al.

(10) Patent No.: US 8,406,775 B2
(45) Date of Patent: Mar. 26, 2013

(54) METHOD FOR SELECTING BEAMS DURING INITIAL SYNCHRONIZATION PROCESS USING SWITCHED BEAM, SWITCHED BEAM OPERATION METHOD AND INITIAL SYNCHRONIZATION USING THE SAME

(75) Inventors: Jae-Young Ahn, Daejon (KR); Yong-Soo Cho, Seoul (KR); Hyun-Soo Ko, Seoul (KR)

(73) Assignees: Electronics and Telecommunications Research Institute, Daejeon (KR); Chung-Ang University Industry-Academy Cooperation Foundation, Seoul (KR)

( * ) Notice: Subject to any disclaimer, the term of this patent is extended or adjusted under 35 U.S.C. 154(b) by 1000 days.

(21) Appl. No.: 11/914,922

(22) PCT Filed: Dec. 13, 2005

(86) PCT No.: PCT/KR2005/004261
§ 371 (c)(1),
(2), (4) Date: May 6, 2008

(87) PCT Pub. No.: WO2006/123854
PCT Pub. Date: Nov. 23, 2006

(65) Prior Publication Data
US 2009/0116565 A1 May 7, 2009

(30) Foreign Application Priority Data
May 17, 2005 (KR) .................. 10-2005-0041179

(51) Int. Cl.
*H04W 40/00* (2009.01)
(52) U.S. Cl. ............ 455/447; 455/550; 455/562.1
(58) Field of Classification Search .......... 455/446, 455/457, 448, 449, 450, 451, 562.1, 447; 342/377; 370/377
See application file for complete search history.

(56) References Cited

U.S. PATENT DOCUMENTS
(Continued)

FOREIGN PATENT DOCUMENTS

| EP | 0 963 129 | 12/1999 |
|----|-----------|---------|
| EP | 1 418 779 | 5/2004 |

(Continued)

OTHER PUBLICATIONS

"Smart Antennas for Broadband Wireless Access" (IEEE Emerging Technologies Symposium: Broadband, Wireless Internet Access, pp. 1-5, Apr. 2000).

(Continued)

*Primary Examiner* — Yuwen Pan
*Assistant Examiner* — Fatuma Sherif
(74) *Attorney, Agent, or Firm* — Kile Park Reed & Houtteman PLLC

(57) ABSTRACT

A method for selecting beams, a switched beam operation method during an initial synchronization process, and an initial synchronization method using it are provided for selecting beams to minimize the probability of occurrence of interferences between cells by considering a distance between beams within neighboring sectors during an initial synchronization process using switched beams, in an orthogonal frequency division multiplexing (OFDM) cellular system employing a smart antenna. The inventive method comprises the steps of dividing each cell into sectors, and counting the number of fixed beams per cell, and selecting a switched beam for minimizing probability of interference, from fixed beams presenting in a corresponding sector, based on distances between a selected beam and beams of all of adjacent cells and the number of cases to be selected in a subsequent time slot, according to the counted number of the fixed beams existing in each sector.

14 Claims, 14 Drawing Sheets

U.S. PATENT DOCUMENTS

| | | | |
|---|---|---|---|
| 5,610,617 A | | 3/1997 | Gans et al. |
| 6,141,335 A | * | 10/2000 | Kuwahara et al. ............ 370/342 |
| 6,262,980 B1 | * | 7/2001 | Leung et al. .................. 370/336 |
| 6,751,206 B1 | * | 6/2004 | Padovani et al. ............. 370/335 |
| 6,795,413 B1 | | 9/2004 | Uhlik |
| 7,065,383 B1 | * | 6/2006 | Hovers et al. .............. 455/562.1 |
| 2001/0034236 A1 | * | 10/2001 | Tong et al. .................... 455/450 |
| 2004/0063468 A1 | * | 4/2004 | Frank ............................ 455/561 |
| 2005/0025093 A1 | * | 2/2005 | Yun et al. ..................... 370/328 |
| 2005/0059437 A1 | * | 3/2005 | Son et al. ...................... 455/574 |
| 2005/0073976 A1 | * | 4/2005 | Fujii ............................. 370/334 |
| 2005/0221861 A1 | * | 10/2005 | Zeira .......................... 455/562.1 |
| 2011/0065448 A1 | * | 3/2011 | Song et al. ................. 455/452.2 |

FOREIGN PATENT DOCUMENTS

| | | |
|---|---|---|
| JP | 2001-223516 | 8/2001 |
| JP | 2001-251270 | 9/2001 |
| KR | 10-1999-013271 | 2/1999 |
| KR | 10-2002-0037965 A | 5/2002 |
| KR | 10-2003-0014801 A | 2/2003 |
| KR | 1020050091586 A | 9/2005 |

OTHER PUBLICATIONS

"Reduction of Carrier-to-interference Ratio in Fixed Broadband Wireless Access Networks Employing Beam-Switched Base Station Antennas" (IEEE International Symposium on Antennas and Propagation Society, vol. 1, pp. 598-601, Jun. 2002).

International Preliminary Report on Patentability for International Application No. PCT/KR2005/004261, dated Aug. 30, 2007.

* cited by examiner

METHOD FOR SELECTING BEAMS DURING INITIAL SYNCHRONIZATION PROCESS USING SWITCHED BEAM, SWITCHED BEAM OPERATION METHOD AND INITIAL SYNCHRONIZATION USING THE SAME

TECHNICAL FIELD

The present invention relates to a method for selecting beams during an initial synchronization process using a switched beam, a switched beam operation method, and an initial synchronization method using the same, and more particularly, to a method for selecting beams, a switched beam operation method during an initial synchronization process, and an initial synchronization method using the switched beam, which are capable of preventing interference between cells caused due to a superimposition between adjacent cell beams during an initial synchronization process using a switched beam in an orthogonal frequency division multiplexing (OFDM) cellular system employing a smart antenna.

BACKGROUND ART

Recently, there has been an increase in a need for a high-speed data transmission, and an OFDM cellular system is adopted as a transmission system for a variety of high speed transmission system due to the compatibility with such high-speed transmission. The OFDM system may be equipped with a smart antenna for an increase in a received signal to noise ratio, an expansion of service coverage, and an increase in a base station processing capacity, and interference cancellation between cells in a cellular system having a frequency reuse factor 1.

However, in cases where a conventional OFDM cellular system makes use of such a smart antenna, there exists a need for supporting mixed users with smart antenna and omnidirectional antennas and also problems such as a coverage mismatch between data channels and broadcast information. Generally, such problems can be solved by employing a method that divides a smart antenna area and an omnidirectional antenna area by symbol units, and a method that transmits broadcast information using beams of smart antenna over multiple time slots to improve cell coverage.

To achieve an initial connection and operation of a mobile station, however, basic operation parameters of a system need to be transmitted as broadcast signals from a base station. In a communication system adopting a smart antenna, typically, a base station uses a plurality of antennas and a mobile station utilizes a single antenna. Therefore, signals of the mobile station first need to be detected on an uplink in order to calculate an antenna weight vector for an adaptive beamforming in the base station.

However, for the initial connection and operation of the mobile station, the mobile station must acquire basic operation parameters such as broadcast signals for a downlink. This makes it difficult for the base station to transmit such basic system operation parameters through an adaptive beamforming.

To overcome such drawbacks, generally, the base station tends to repeatedly transmit initial basic system operation parameters by time or frequency units through switched beams in preset multiple directions.

However, the above-described method has a disadvantage in that loss of data can be caused by the collision between subcarriers of adjacent cells in cases where beams emitted from each base station in a multiple cell environment are superimposed each other.

In an OFDM cellular system using a smart antenna, broadcast information is transmitted over multiple time slots using switched beams to overcome a coverage mismatch between data channels and broadcast information. In such a case, however, beams are generally switched in a predetermined order, which might cause interferences due to a superposition of such beams.

As a prior art for prevention of superimposition of beams of neighboring cells, U.S. Pat. No. 6,795,413 registered Sep. 21, 2004, entitled "Radio communications system in which traffic is transmitted on the broadcast channel" discloses a method for transmitting data via a broadcast channel in a radio communications system adopting a space division multiple access (SDMA). This prior art seeks to prevent interferences between cells by prohibiting transmission of adjacent cells in a process of transmitting broadcast information wherein one base station transmits broadcast information only during one frame in a superframe. The above-captioned prior art has an advantage in that interferences between adjacent cells during transmission of broadcast information are prevented, but a disadvantage in that much time consumption needs until registration of mobile station. On the contrary, the present invention proposes a method that takes into account simultaneous transmission of broadcast information from all of cells and then applies a beam selection technique to prevent interferences between cells that may be occurred therein. Thus, the present invention can complete the initial registration during a short time under a condition where interferences between adjacent cells hardly occur.

DISCLOSURE

Technical Problem

It is, therefore, an object of the present invention to provide a method for selecting beams, a switched beam operation method during an initial synchronization process, and an initial synchronization method using it, for selecting beams to minimize interferences between cells by considering a distance between beams within neighboring sectors during an initial synchronization process using switched beams, in an OFDM cellular system employing a smart antenna.

Technical Solution

In accordance with one aspect of the present invention, there is provided a method for selecting beams during an initial synchronization process using a switched beam in a radio communications system, the method comprising the steps of: dividing each cell into sectors, and counting the number of fixed beams per each cell; and selecting a switched beam for minimizing probability of interference, from fixed beams presenting in a corresponding sector, based on distances between a selected beam and beams of all of adjacent cells and the number of cases to be selected in a subsequent time slot, according to the counted number of the fixed beams existing in said each sector.

Further, the method for selecting beams of the present invention includes the step of preventing interference between cells caused due to a superimposition between beams of adjacent cells by keeping a predetermined distance between all of the selected beams.

In accordance with another aspect of the present invention, there is provided a method for operating the switched beam selected by the beam selecting method, wherein the method is implemented such that a base station repeatedly transmits a pair of a preamble and broadcast information of an orthogonal frequency division multiplexing/time division multiple access (OFDM/TDMA) downlink sub-frame to a mobile station, using the switched beam selected by the beam selecting method, in an OFDM/TDMA system where users are identified by allocating time slots to the mobile station, the pair of preamble and broadcast information with a certain gap being transmitted using a switched beam selected by an independent beam selection method, and data being transmitted using an adaptive beam.

In accordance with another aspect of the present invention, there is provided a method for operating the switched beam selected by the beam selecting method, wherein the method is implemented such that a frequency band for transmission of broadcast information and a frequency band for transmission of data are separately allocated, a base station repeatedly transmits a pair of a preamble and broadcast information of an OFDMA downlink subframe to a mobile station using the switched beam selected by the beam selecting method, and data are transmitted using an adaptive beam, in an OFDMA system where different subchannels are allocated to the mobile station and a predetermined subchannel for transmitting broadcast information is allocated to the mobile station.

In accordance with still another aspect of the present invention, there is provided an initial synchronization method using the switched beam selected by the beam selecting method, wherein the method is implemented such that a base station selects one beam from among fixed beams for time slots in accordance with the beam selecting method, and transmits a preamble and broadcast information to an entire area or a predetermined area of a cell during a predetermined time slot when a downlink preamble and broadcast information are transmitted to an initial mobile station at a state where a position of mobile station or a weight vector is not acquired, to thereby allow the mobile station which has achieved a successive synchronization and acquisition of broadcast information to transmit a control symbol to the base station and then try a registration.

The present invention discloses a method for preventing interferences between cells during an initial synchronization process in an OFDM cellular system. In the present invention, a predetermine distance is kept among beams selected in consideration of the distances between the selected beams and beams of adjacent cell sectors, to thereby avoid a superimposition of beams. This invention takes into account for a case where transmission of broadcast information is made at the same time in all the cells, and a case where a variety of sector cells and fixed beams exist.

Advantageous Effects

The present invention enables an initial registration during a short time under a condition where interference with adjacent cells hardly occurs. This invention can be applied to a variety of systems such as an FDMA system, an FDD system, a mobile BWA system, etc., as well as a TDMA system and a TDD system, in consideration of various types of sectored cells and fixed beams. In addition, the present invention has effects of improving performance when switched beams operate in an OFDM/TDMA system, an OFDMA system, and so on.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description in association with the accompanying drawings; and based on the foregoing, the technical spirit of the invention will be readily conceived by those skilled in the art to which the invention belongs. Further, in the following description, well-known arts will not be described in detail if it seems that they could obscure the invention in unnecessary detail. Hereinafter, a preferred embodiment of the present invention will be set forth in detail with reference to the accompanying drawings.

An initial synchronization process in an OFDM cellular system using a smart antenna is a process where a base station transmits a downlink preamble and broadcast information to an initial mobile station under a state where a position of the mobile station or a weight vector is not acquired. Under such state, the base station makes use of a rotary type switched beam owing to a difficulty in applying an adaptive beam thereto.

The rotary type switched beam used herein implies that one beam is selected from among fixed beams for each of time slots, and a preamble and broadcast data are transmitted to an entire area or a predetermined area of a cell during a fixed time slot. When the mobile station achieves a successive synchronization and acquisition of broadcast information, it transmits a control symbol to the base station and tries a registration thereof. Differently from a downlink transmission where a switched beam is used, the base station may receive the control symbol using any one of a nondirectional beam, a switched beam, a fixed beam, and an adaptive beam, during an uplink transmission.

However, if the base station selects beams in an arbitrary order during an initial synchronization process using a switched beam, the selected beams may be superimposed with beams of adjacent cells, which may cause interferences between cells. Especially, they may collide with subcarriers of adjacent cells in an OFDM cellular system with a frequency reuse factor 1, thereby resulting in a significant degradation of performance.

The present invention suggests a beam selecting method for preventing interference between cells during an initial synchronization process using a switched beam in an OFDM cellular system. In the method of the present invention, a predetermined distance is kept among all of beams selected in consideration of distances between the selected beams and beams of adjacent sector cells, which takes place no superimposition between beams.

Figure 8:
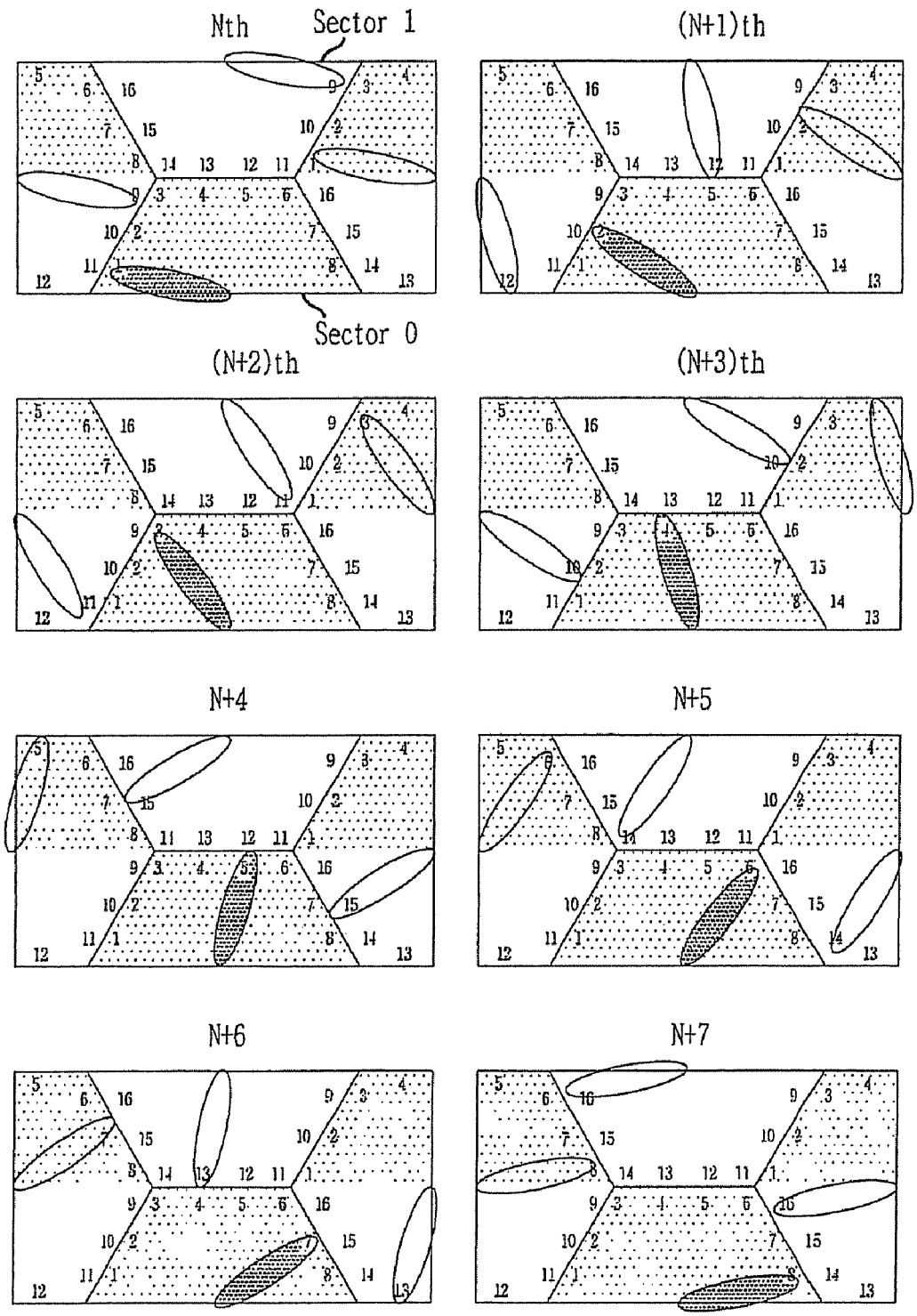
FIG. 8 illustrates a method for selecting beams from among eight fixed beams of two-sector cells in accordance with a first embodiment of the present invention.
Figure 9:
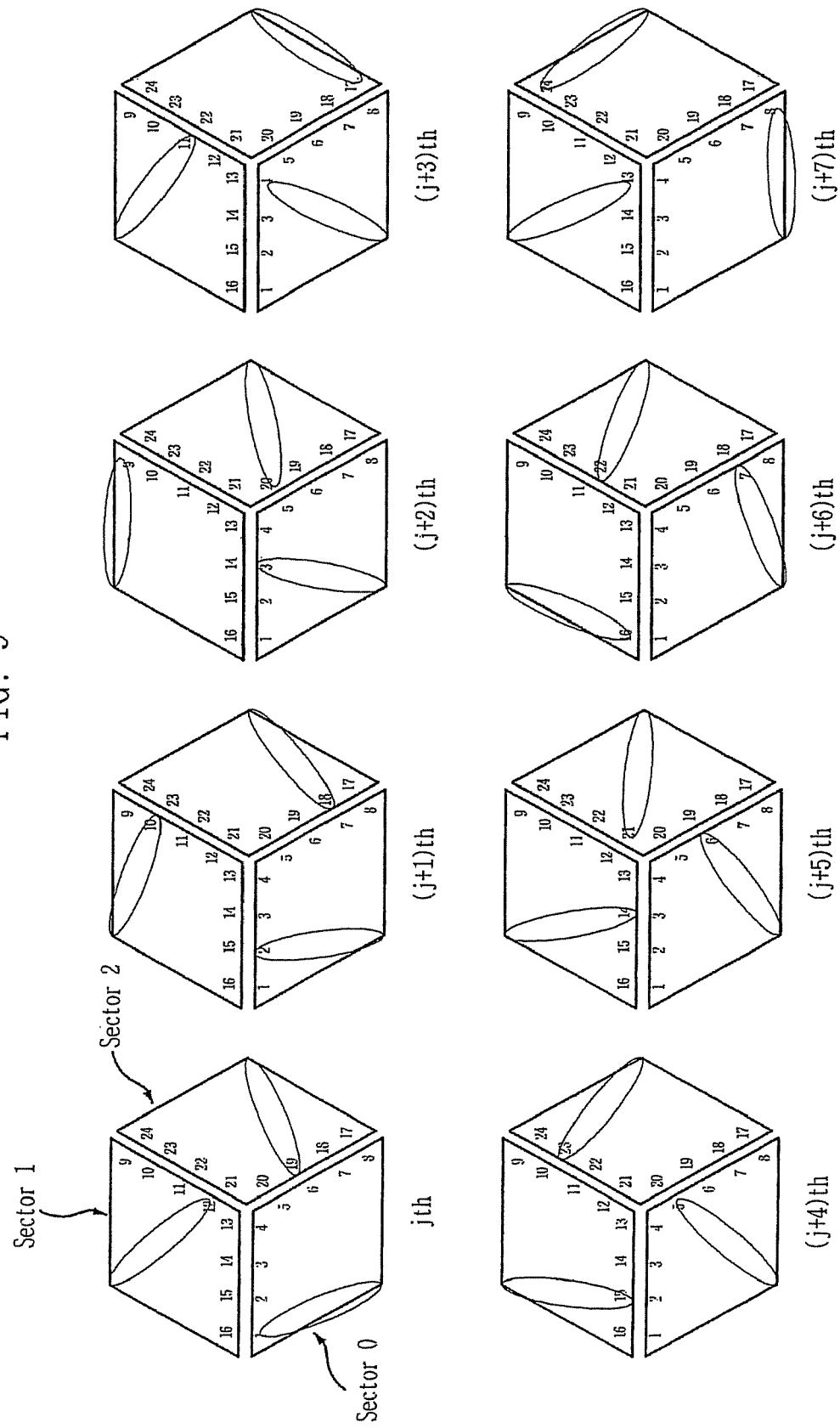
FIG. 9 illustrates a method for selecting beams from among eight fixed beams of three-sector cells in accordance with a second embodiment of the present invention.

In the method that selects beams for minimizing a probability of occurrence of interferences by considering distances between selected beams and beams of adjacent sectors (sector cells) in a cell environment having a variety of sectors, beams are selected from eight fixed beams existing in each sector in case of two-sector cells (refer to FIG. 8), and from eight fixed beams existing in each sector in case of three-sector cells (refer to FIG. 9). Further, beams are selected from four fixed beams existing in each sector in case of three-sector cells (refer to FIG. 10), from six fixed beams existing in each sector in case of three-sector cells (refer to FIG. 11), and from four fixed beams existing in each sector in case of four-sector cells (refer to FIG. 12).

Figure 1:
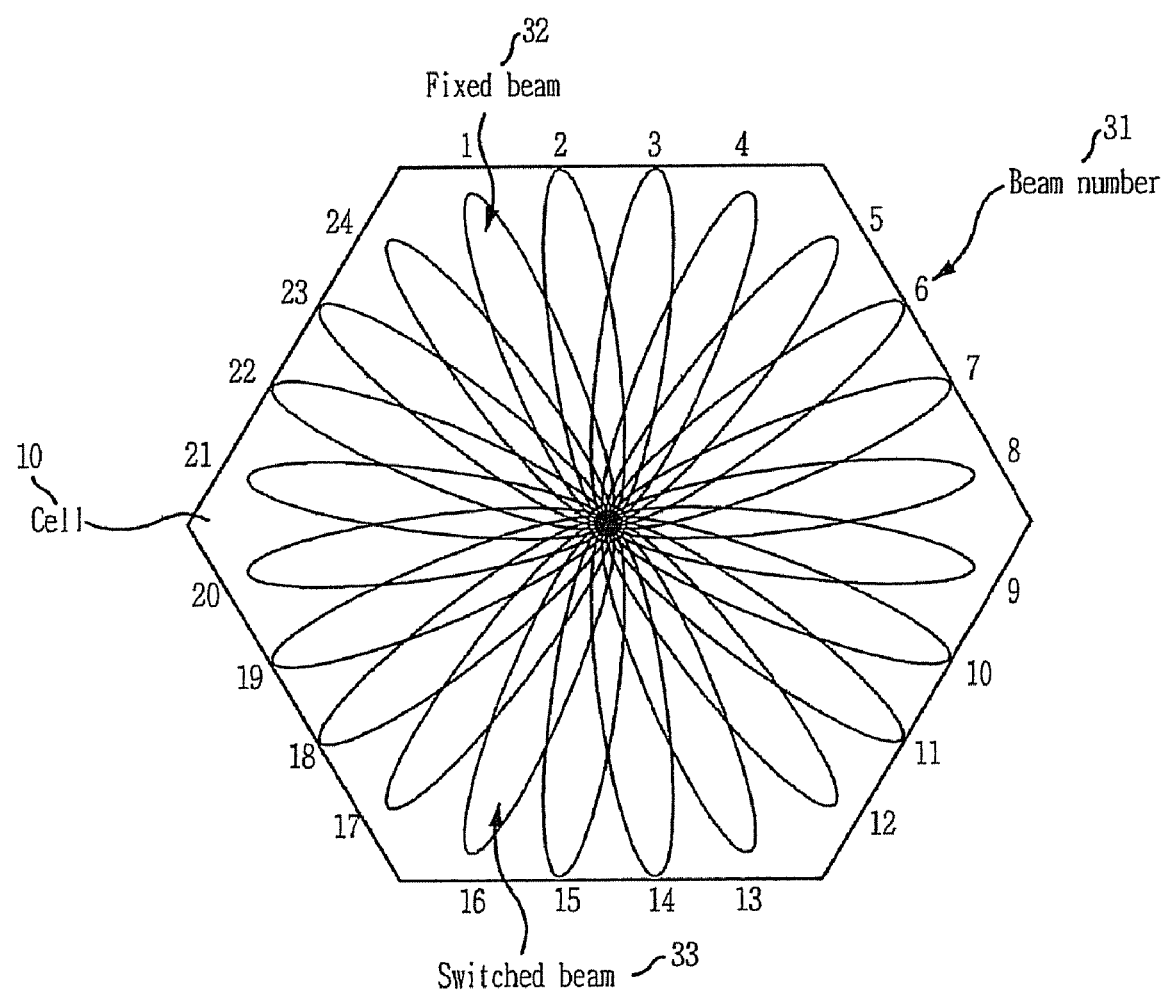
FIG. 1 is a diagram illustrating a fixed beam pattern and a switched beam in an omnidirectional cell in an OFDM cellular system employing a smart antenna in accordance with the present invention.
Figure 2:
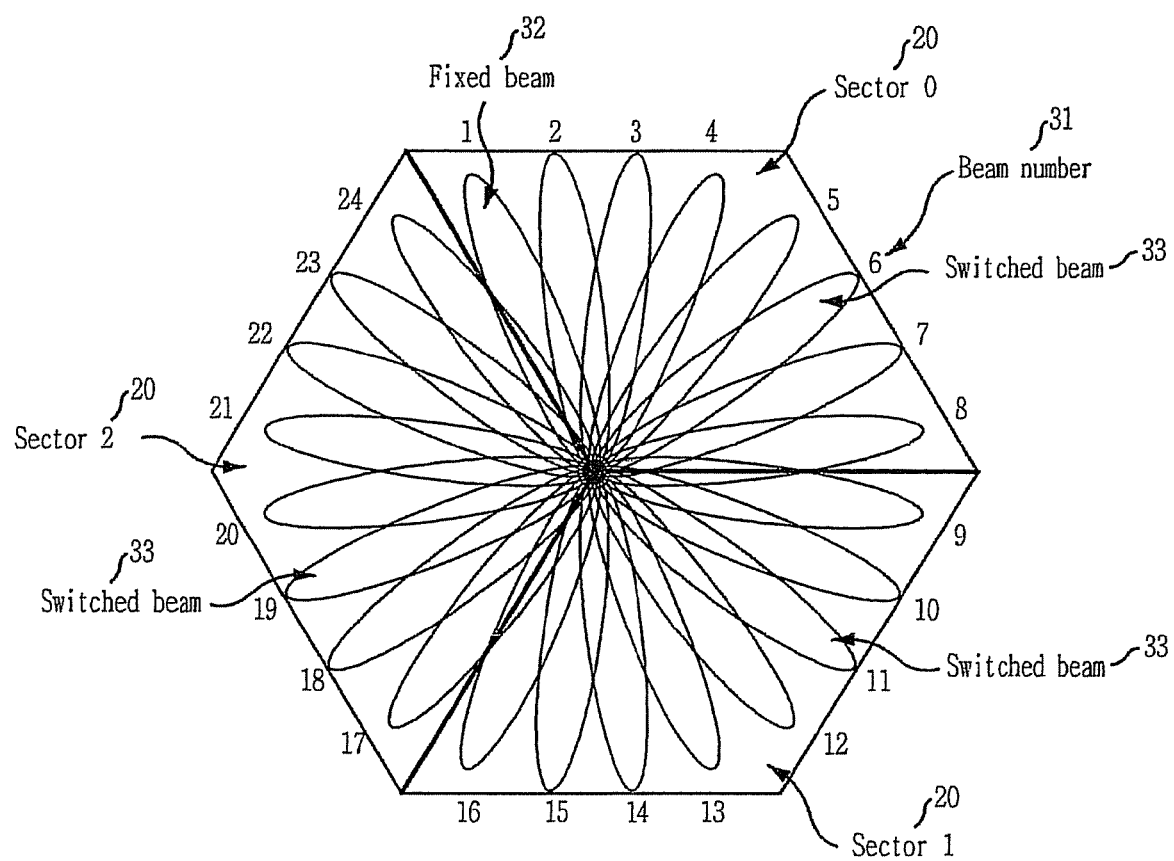
FIG. 2 is a diagram illustrating a fixed beam pattern and a switched beam in three-sector cells in an OFDM cellular system employing a smart antenna in accordance with the present invention.

FIG. 1 illustrates a fixed beam pattern and a switched beam in an omnidirectional cell in an OFDM cellular system employing a smart antenna to which the present invention is applied, and FIG. 2 illustrates a fixed beam pattern and a switched beam in a three-sector cell in an OFDM cellular system employing a smart antenna to which the present invention is applied.

In a smart antenna system in which circular antenna array and linear antenna array are used for a flexible sector configuration, numbers of fixed beams assigned to an omnidirectional cell 10 are also used in three-sector cells 20 for identical use in both cells 10 and 20.

As shown in FIG. 1, a pattern of fixed beams 32 can be formed in the omnidirectional cell 10, and the fixed beams have sequential beam number 31.

A switched beam 33 is one selected from the fixed beams 32. For example, if twenty-four fixed beams exist in the omnidirectional cell 10, one beam is selected from the whole twenty-four fixed beams.

The omnidirectional cell 10 shown in FIG. 1 can be comprised of the three-sector cells 20 having a pattern of eight fixed beams per sector as shown in FIG. 2. The omnidirectional cell 10 is divided into a sector 0, a sector 1, and a sector 2; and has eight fixed beams 32 per sector.

Beam numbers 31 are sequentially assigned to the fixed beams 32 in the three-sector cells 20 as in the omnidirectional cell 10, wherein the leftmost beam of the sector 0 is given by number 1 and the rightmost beam of the sector 2 is given by number 24.

The switched beam 33 is one selected from the fixed beams 32. For instance, one beam is selected from the eight fixed beams 32 in each sector in the case of three-sector cells 20.

Now, configurations of an uplink subframe and a downlink subframe in an OFDM/FDD system and an OFDM/TDD system using a smart antenna will be explained with reference to FIGS. 3 and 4.

In an OFDM cellular system using a smart antenna, basic system operation parameters are repeatedly transmitted via multiple switch beams. For this, a pair of preamble a and broadcast information b is repeatedly arranged in head portions of downlink subframes 211 and 221.

Figure 3:
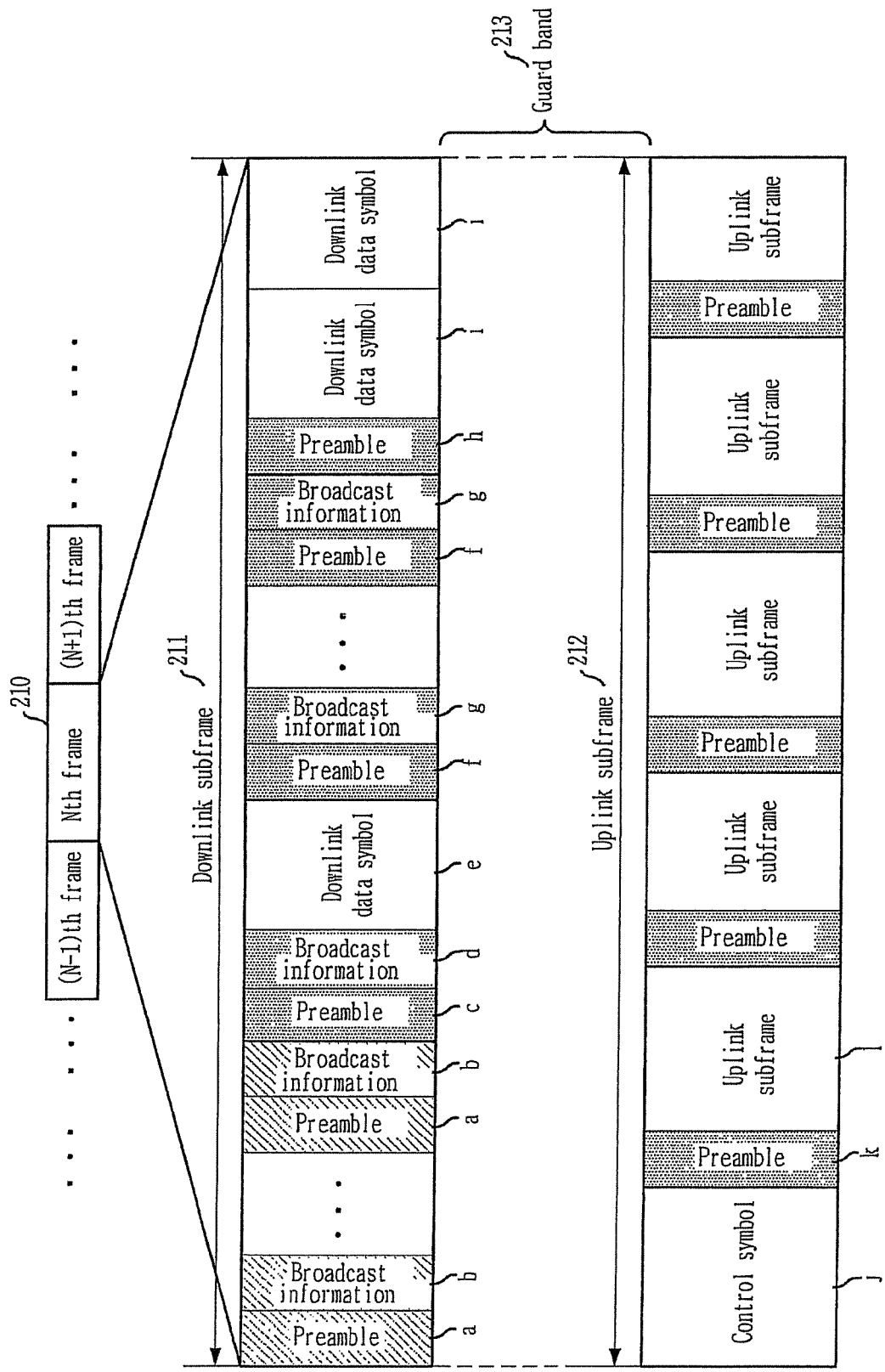
FIG. 3 illustrates configurations of an uplink subframe and a downlink subframe in an OFDM/FDD system employing a smart antenna in accordance with the present invention.

At first, as shown in FIG. 3, a frame 210 of an OFDM/FDD system includes the downlink subframe 211 and an uplink subframe 212, which have a guard band 213 therebetween.

Here, the downlink subframe 211 is transmitted from a base station, and the pair of preamble a and broadcast information b contain information for an uplink transmission of a mobile station. The same information is repeatedly transmitted using a switched beam so as to obtain space diversity.

Further, a preamble c, broadcast information d and a downlink data symbol e shown subsequently from the preamble a and broadcast information are arranged for a specific mobile station, and transmitted in a unicast method using an adaptive beam terminal. The broadcast information d contains only information with respect to the downlink data symbol e transmitted to the specific mobile station.

And also, a pair of preamble f and broadcast information g contains information of downlink data symbols i which are transmitted with a small interval, wherein identical information is transmitted using a switched beam. A preamble h exists in front of the downlink data symbols I; and the preamble h and the downlink data symbols i are transmitted using an adaptive beam.

In the meantime, the uplink subframe 22 is transmitted from a plurality of mobile stations, and the mobile station that has received data required for an uplink transmission transmits a control symbol j and then tries a registration. A base station may receive the control symbol j using various types of beams.

A preamble k and an uplink data symbol 1 are transmitted from the registered mobile station during an allocated time, and the base station may receive them using an adaptive beam.

Figure 4:
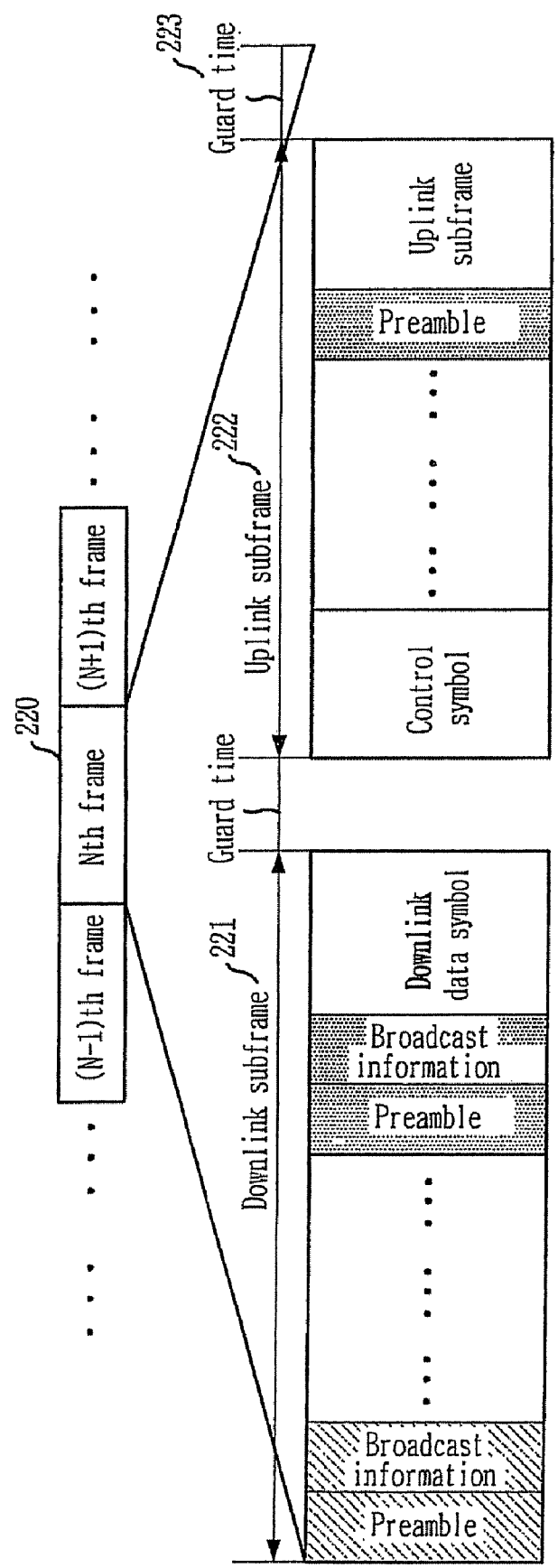
FIG. 4 illustrates configurations of an uplink subframe and a downlink subframe in an OFDM/TDD system employing a smart antenna in accordance with the present invention.

As shown in FIG. 4, a frame 220 of an OFDM/TDD system also includes a downlink subframe 221 and an uplink subframe 222, in which a guard time 223 is prepared therebetween for discriminating those time slots.

Here, configurations of the downlink subframe 221 and the uplink subframe 222 of the OFDM/TDD system are the same as those of the downlink subframe 211 and the uplink subframe 212 of the OFDM/FDD system shown in FIG. 3. However, beamforming coefficients calculated in an uplink can be applied to a downlink in the OFDM/TDD system where adaptive beaming can be used.

Now, superimposition between selected beams and beams of adjacent cells will be described with reference to FIGS. 5 to 7, and thereafter a method for selecting beams for avoiding such superimposition will be explained.

Figure 5:
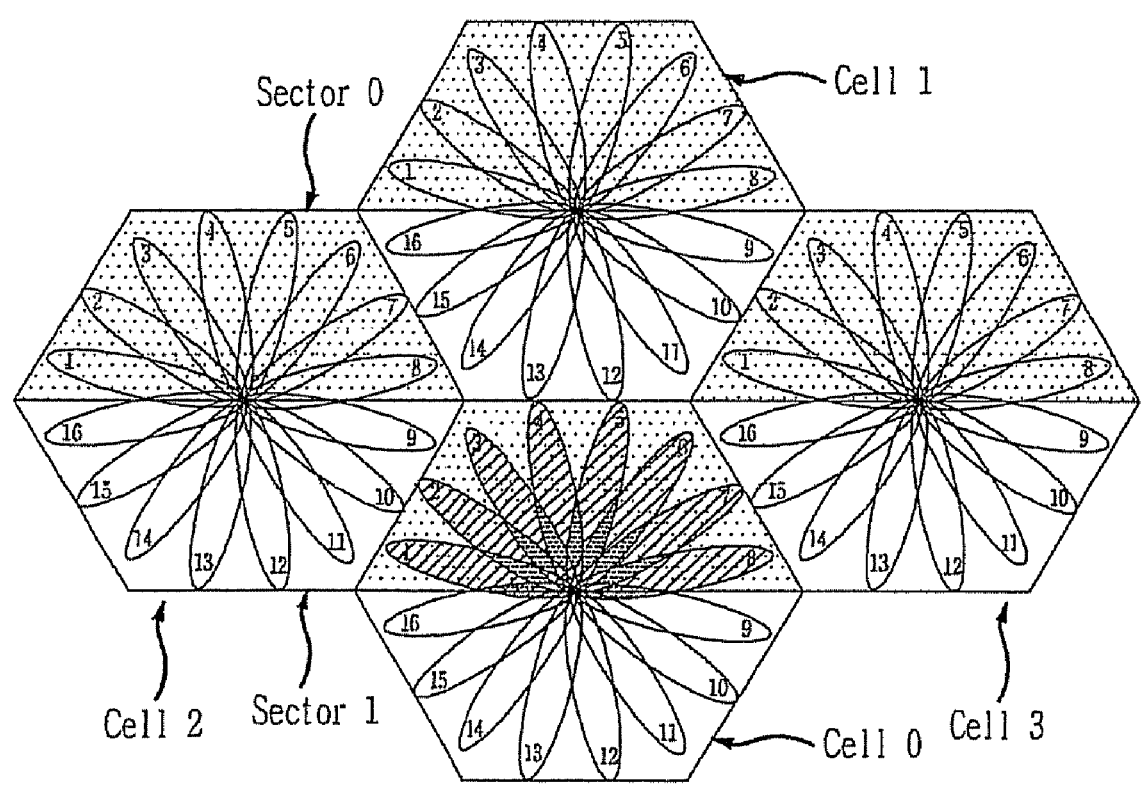
FIG. 5 illustrates a phenomenon where eight fixed beams are superimposed with beams of adjacent cells in two-sector cells.

FIG. 5 shows an example of a fixed beam pattern of sectors of adjacent cells (sector cells), wherein eight fixed beams exist in each sector of two-sector cells.

In FIG. 5, each cell is divided into sector 0 and sector 1, and sector 0 of cell 0 will be a reference sector for convenience of description.

As shown in FIG. 5, the reference sector is adjacent to sector 1 of cell 1, sector 1 of cell 2, and sector 1 of cell 3, and the beam of the reference sector is directed toward the adjacent sectors. Therefore, beams 1 to 8 of cell 0 are likely to be superimposed with beams 11 to 14 of cell 1, beams 9 to 11 of cell 2, and beams 14 to 16 of cell 3.

Figure 6:
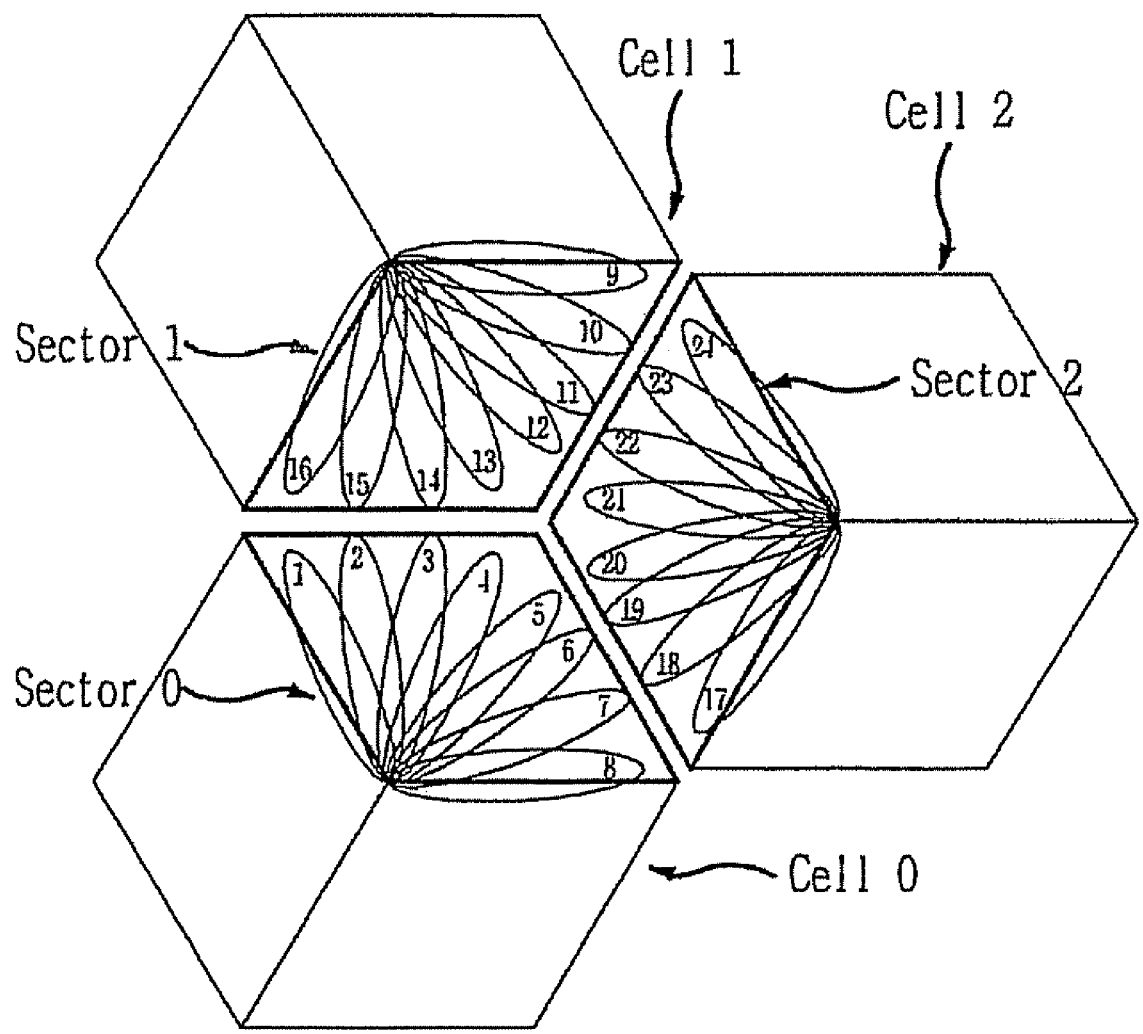
FIG. 6 illustrates a phenomenon where eight fixed beams are superimposed with beams of adjacent cells in three-sector cells.

FIG. 6 provides another example of a fixed beam pattern of sectors of adjacent cells (sector cells), wherein eight fixed beams exist in each sector of three-sector cells.

As depicted in FIG. 6, each cell is divided into sector 0, sector 1, and sector 2; and sector 0 of cell 0 serving as a reference sector is adjacent to sector 1 of cell 1 and sector 2 of cell 2. Therefore, beams 1 to 4 of cell 0 are likely to be superimposed with beams 13 to 16 of cell 1, and beams 5 to 8 of cell 0 are likely to be superimposed with beams 17 to 20 of cell 2.

Figure 7:
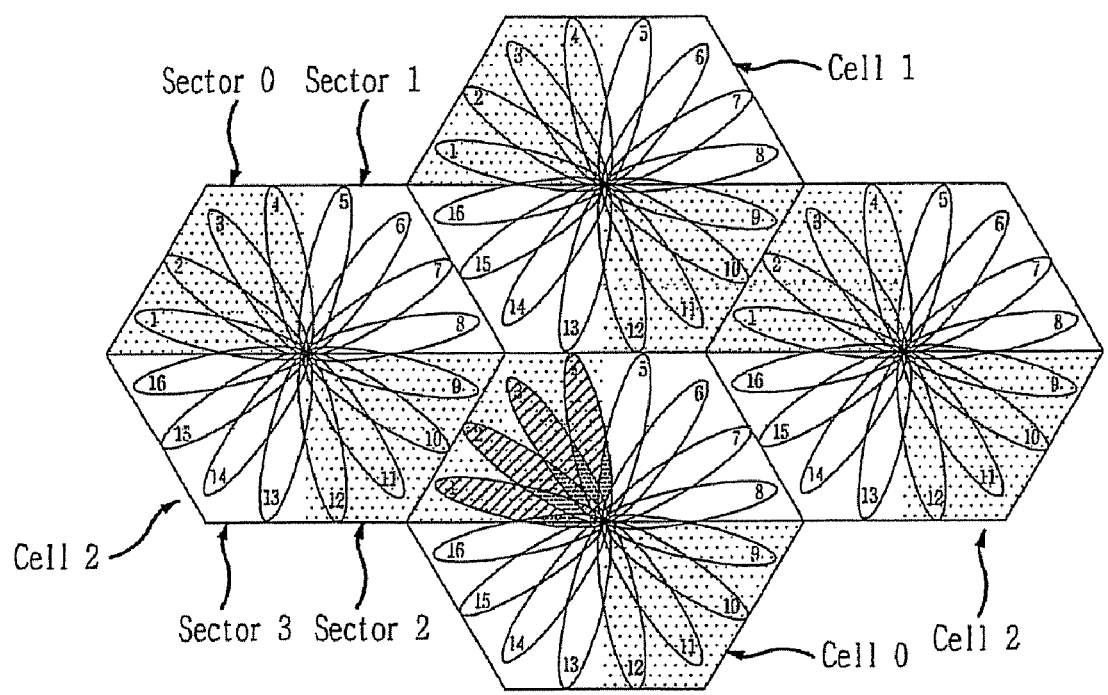
FIG. 7 illustrates a phenomenon where four fixed beams are superimposed with beams of adjacent cells in four-sector cells.

FIG. 7 shows still another example of a fixed beam pattern of sectors of adjacent cells (sector cells), wherein four fixed beams exist in each sector of four-sector cells.

As depicted in FIG. 7, each cell is divided into sector 0, sector 1, sector 2, and sector 3; and sector 0 of cell 0, serving as a reference sector, is adjacent to sector 3 of cell 1, sector 2 of cell 2 and sector 3 of cell 3. Therefore, beams 1 to 4 of cell 0 are likely to be superimposed with beams 13 and 14 of cell 1, beams 9 to 12 of cell 2, and beams 13 to 16 of cell 3.

Now, a method for selecting beams to avoid interference between beams in a variety of sectored cells (superimpositions with the beams of the adjacent cells in FIGS. 5 to 7) will be explained in detail referring to FIGS. 8 to 12.

FIG. 8 illustrates a method for selecting beams from among eight fixed beams of two-sector cells in accordance with a first embodiment of the present invention, wherein eight fixed beams exist in each sector of the two-sector cells.

FIG. 8 gives sector 0 of cell 0 as a reference sector similarly to FIG. 5 where a method for selecting beams is applied in a same manner to all of cells. For example, if beam 1 is selected in sector 0 and beam 9 is selected in sector 1, beam 1 and beam 9 are selected as switched beams in all of cells.

If beams 1 to 8 are sequentially selected in sector 0 during Nth to (N+7)th time slots, it may be seen that superimposition of beams is determined in accordance with the beam selection in sector 1. In other words, selection of beams necessitates a consideration with respect to the distance between selected beams and beams of all of adjacent cells and the number of cases for selection in the subsequent time slot. For example, if beams 9 to 16 are selected in order in sector 1, beams 4 and 5 in (N+3)th and (N+4)th time slots are superimposed with beams 12 and 13.

In order to prevent the above problems, if beams 12 to 9 are selected during Nth to (N+3)th time slots, and beams 16 to 13 are selected during (N+4)th to (N+7)th time slots, superimposition between beams cannot be occurred; but the slightly adjacent beam is selected as in the case where beams 2 and 11 are selected in (N+1)th time slot. Thus, if beams 9, 12, 11, and 10 are selected in Nth to (N+3)th time slots, and beams 13, 16, 15, and 14 are selected in (N+4)th to (N+7)th time slots, a predetermined gap needs to be maintained between beams.

The method for selecting beams as described above can be expressed as the following equation 1:

$$BN = ps[NoB \times SN + (FN \times N + [1:N] - 1)_{mod(NoB)} + 1]$$  Eq. (1)

In Eq. (1) above, BN denotes beam numbers, SN denotes sector numbers, and FN denotes frame numbers. In addition, N indicates the number of times of transmission of preamble in one frame, and NoB implies the number of fixed beams in a sector. Further, set [1:N] denotes an integer sequence from 1 to N. For example, if N is 4, [1:4] is a sequence [1 2 3 4]. Operational sign $(\bullet)_{mod(\bullet)}$ denotes a residual operation. Sequence ps[•] is a sequence indicating the selection order of beams to be selected in each sector, and is made to satisfy the above-enumerated conditions. The sequence varies depending upon the number of sectors, the number of beams per sector, and a method for selecting beams in sectors. An index for selecting values of sequence ps[ ] is created by $NoB \times SN + (FN \times N + [1:N] - 1)_{mod(NoB)} + 1$, and the numbers of beams selected according to the index create sequence ps[ ].

As shown in FIG. 8, in case where eight fixed beams are present in each sector of two-sector cells, sequence ps[ ] which satisfies the condition of Eq. (1) above may be represented by Eq. (2) as:

$$\{\text{Permutation Base}\} = \{1,2,3,4,5,6,7,8,9,12,11,10,15,14,13,16\}$$  Eq. (2)

For example, in case where eight beams exist in each sector of two-sector cells as shown in FIG. 8, if the transmitted frame number is 1, and the number of preambles repeatedly transmitted per frame is four, beams selected in sector 1 are 15, 14, 13, and 16.

In sector 1, beam 9 is selected for a first preamble of a subsequent frame.

FIG. 9 illustrates a method for selecting beams from among eight fixed beams of three-sector cells in accordance with a second embodiment of the present invention, wherein only sector 0 of cell 0, sector 1 of cell 1, and sector 2 of cell 2 of FIG. 6 are expanded, and the beam numbers are the same as those of FIG. 6.

As mentioned above, a beam selected in Nth time slot should have no interference with beam of an adjacent cell.

However, since sector 0 of cell 0, sector 1 of cell 1, and sector 2 of cell 2 are opposed each other, if beam 1 is selected in sector 0, there exists a high possibility of occurrence of interference between the selected beam and beams 15 and 16 of sector 1. In this case, the beam having the lowest possibility of occurrence of interference would be beam 9; and four beams with lower possibility of occurrence of interference, i.e., beams 9 to 12 are grouped into group A1. In sector 2, four beams having the lower possibility of occurrence of interference with the group A1 would be beams 17 to 20 which are grouped into group A2.

Therefore, beams are selected from the groups A1 and A2 in consideration of interference with beam 1 commonly, wherein the beams are selected from the two groups in such a manner that the probabilities of occurrence of interference become similar when beams 1 to 4 are selected. For instance, if beam 1 is selected, the lowest probability of occurrence of interference is obtained if beam 9 is selected from the group A1 and beam 17 is selected from the group A2. However, if beam 2 is selected, there is no way of selection of beams for maintaining the probability of occurrence of interference with a similar level to that as noted above. For convenience of explanation, the gap between the selected beam and beam 16 is defined as beam gap, under beam 16 opposed to beam 1 as a reference. For example, a beam gap between beam 1 and beam 9 is 7. Here, beam gap should become 2 or higher when beams are selected from group A1 and group A2 so that a probability of occurrence of interference can be maintained at a level lower than a predetermined level.

Further, in case where beams 5 to 8 are selected, beams 13 to 16 of sector 1 are grouped into group B1, and beams 21 to 24 of sector 2 are grouped into group B2; and beams are selected from group B1 and group B2 in such a manner that a beam gap becomes 2 or higher and is maintained at that level.

As shown in FIG. 9, in case where eight fixed beams exist in each sector of three-sector cells, sequence ps[ ] satisfying Eq. (1) above can be expressed as follows:

$$\{\text{Permutation Base}\}=\{1,2,3,4,5,6,7,8,12,10,9,11,15, \\ 14,16,13,19,18,20,17,23,21,22,24\} \quad \text{Eq. (3)}$$

Figure 10:
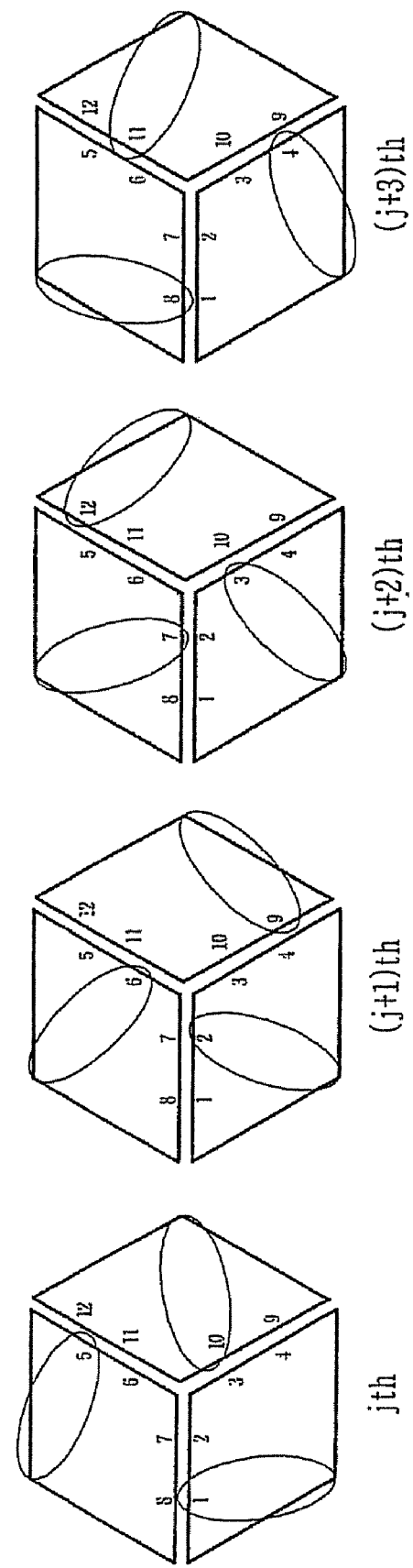
FIG. 10 illustrates a method for selecting beams from among four fixed beams of three-sector cells in accordance with a third embodiment of the present invention.

FIG. 10 illustrates a method for selecting beams from among four fixed beams of three-sector cells in accordance with a third embodiment of the present invention.

Similarly to FIG. 9, only sector 0 of cell 0, sector 1 of cell 1, and sector 2 of cell 2 are expanded in FIG. 10, wherein beam numbers are identical to those of FIG. 6, and four fixed beams exist in each sector, and sequence ps[ ] is formed in the same rule as that of a method for selecting beams from among eight fixed beams of three-sector cells shown in FIG. 9. However, in this case, advantages are that broadcast information can be transmitted during a short time slot while beam width is widened and influence of interference decreases, compared with the case where eight beams are applied (refer to FIG. 9).

In case where four fixed beams exist in each sector of three-sector cells, as shown in FIG. 10, sequence ps[ ] satisfying the condition of the above-described equation 1 is expressed as:

$$\{\text{Permutation Base}\}=\{1,2,3,4,5,6,7,8,10,9,12,11\} \quad \text{Eq. (4)}$$

Figure 11:
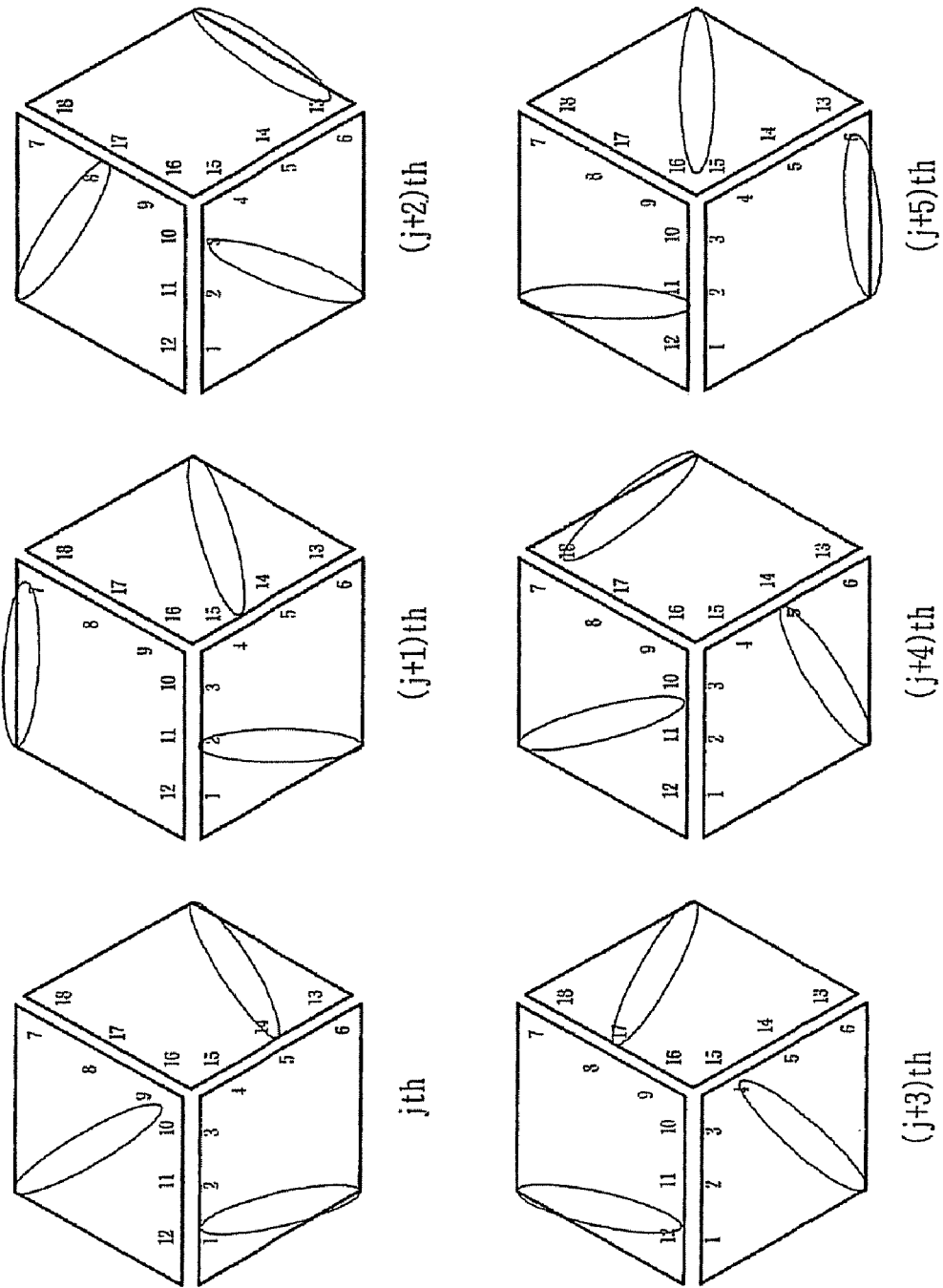
FIG. 11 illustrates a method for selecting beams from among six fixed beams of three-sector cells in accordance with a fourth embodiment of the present invention.

FIG. 11 illustrates a method for selecting beams from among six fixed beams of three-sector cells in accordance with a fourth embodiment of the present invention.

FIG. 11 also expands only sector 0 of cell 0, sector 1 of cell 1, and sector 2 of cell 2, wherein beam numbers correspond to those of FIG. 6, and sequence ps[ ] is formed under the same rule as that of the method for selecting beams from among eight fixed beams of three-sector cells shown in FIG. 9.

In case where six fixed beams exist in each sector of three-sector cells, as shown in FIG. 11, sequence ps[ ] satisfying the condition of the above-described mathematical formula I is represented by the following equation 5:

$$\{\text{PermutationBase}\}=\{1,2,3,4,5,6,9,7,8,12,10,11,14,15, \\ 13,17,18,16\} \quad \text{Eq. (5)}$$

Figure 12:
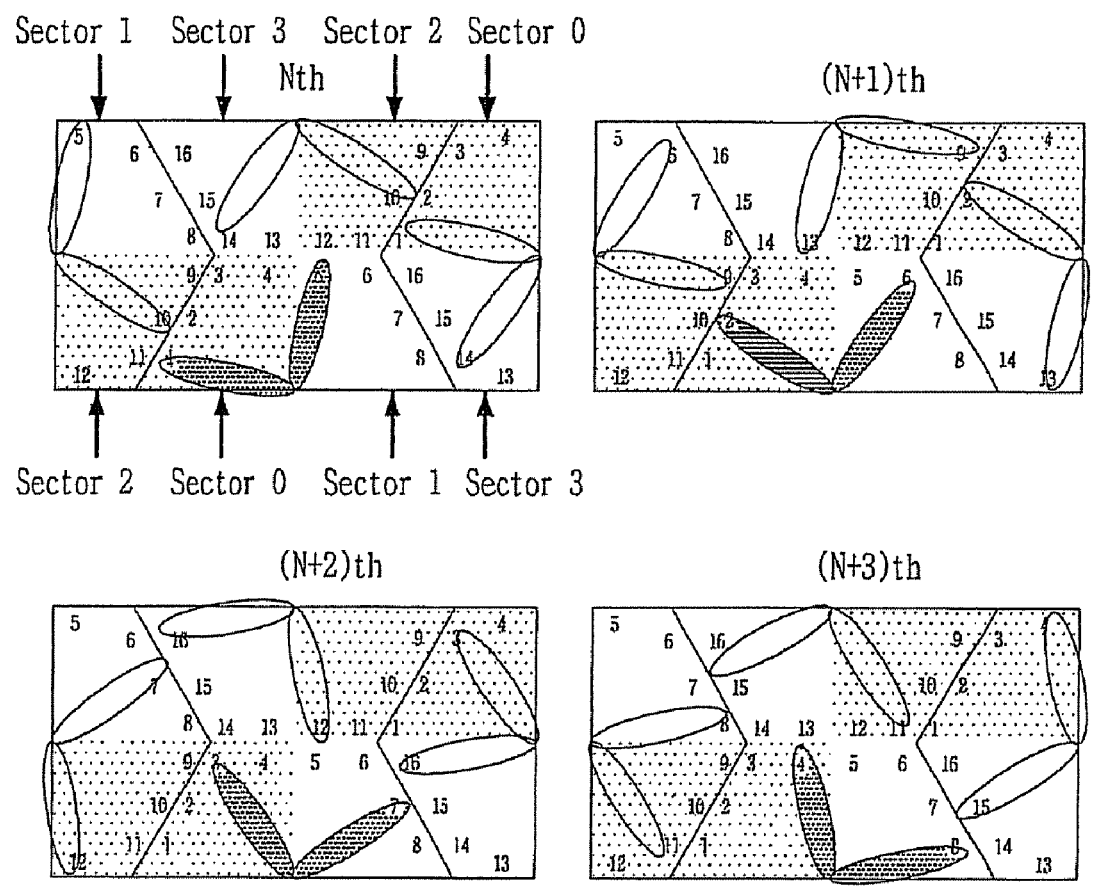
FIG. 12 illustrates a method for selecting beams from among four fixed beams of four-sector cells in accordance with a fifth embodiment of the present invention.

FIG. 12 illustrates a method for selecting beams from among four fixed beams of four-sector cells in accordance with a fifth embodiment of the present invention, wherein four fixed beams exist in each sector of four-sector cells.

In case of four-sector cells as in FIG. 12, the maximum distance between beams of a reference cell and adjacent cells becomes short, and thus the possibility of superimposition further increases. In case where four beams are used as such, probability of occurrence of interference between cells can be lowered using a beam selecting method for minimizing superimposition between beams although probability of occurrence of interference increases due to a wide beam width.

As shown in FIG. 12, beams are selected in order in sector 0 and sector 1 so as to minimize superimposition between beams, and beam selections are made in the residual sectors in directions avoiding rotational beams.

In case where four fixed beams exist in each sector of four-sector cells as in FIG. 12, sequence ps[ ] satisfying the condition of Eq. (1) above is expressed as:

$$\{\text{Permutation Base}\}=\{1,2,3,4,5,6,7,8,10,9,12,11,14, \\ 13,16,15\} \quad \text{Eq. (6)}$$

Figure 13:
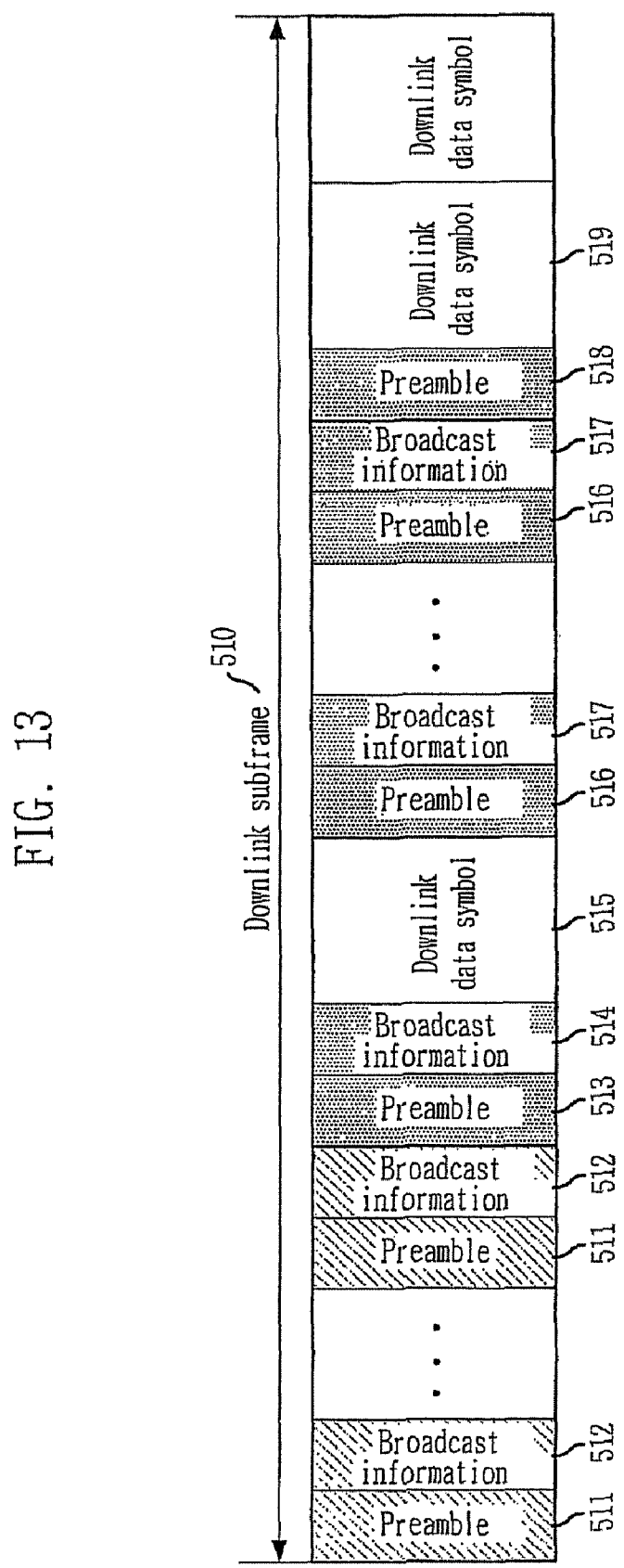
FIG. 13 illustrates a switched beam operation method in an OFDM/TDMA system in accordance with an embodiment of the present invention.
Figure 14:
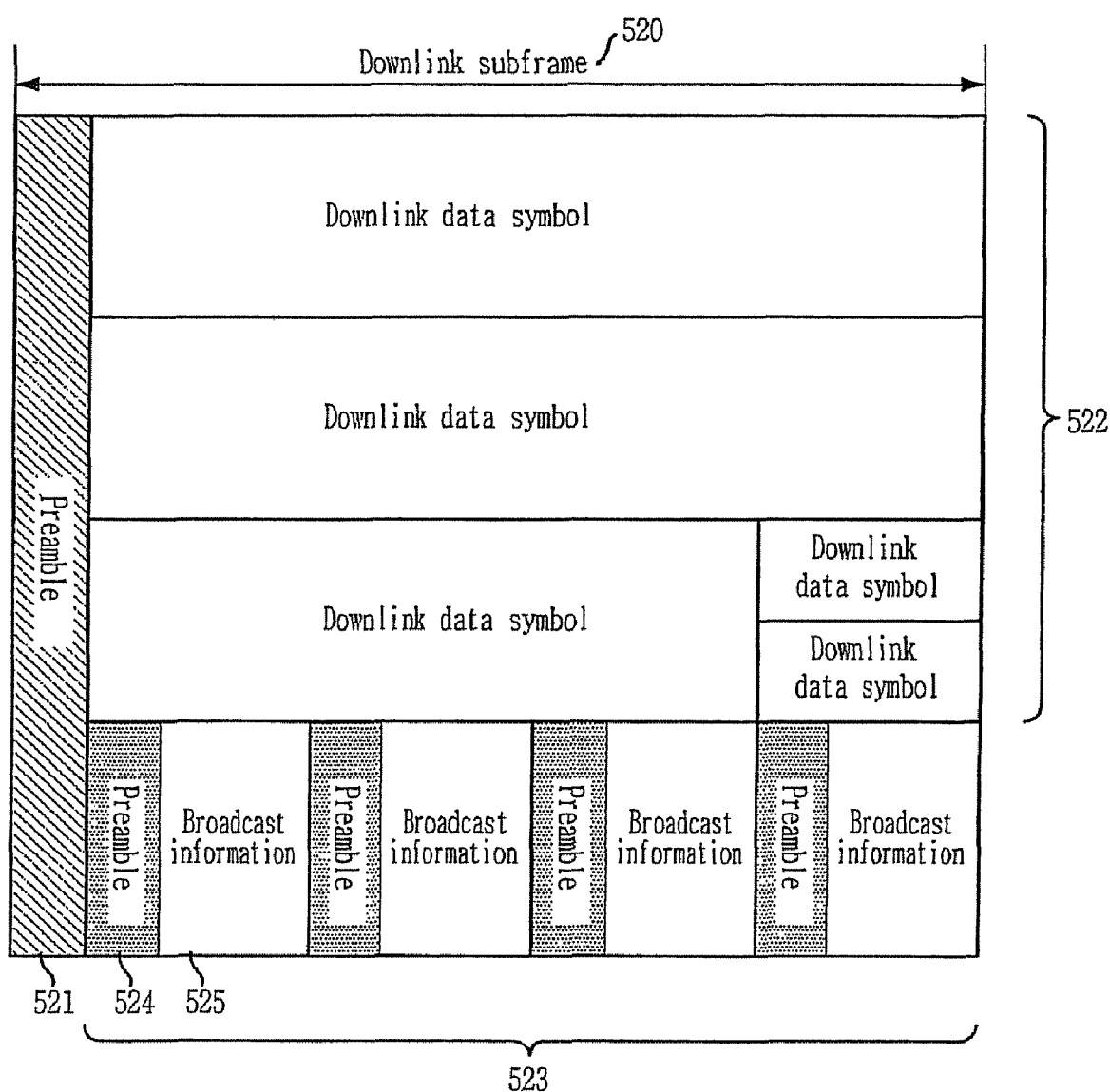
FIG. 14 illustrates a switched beam operation method in an OFDMA system in accordance with another embodiment of the present invention.

When the above-described method for selecting beams is used, a downlink preamble and broadcasting information can be transmitted using a switched beam in accordance with the method for selecting beams in an OFDM/TDMA system and an OFDMA system as shown in FIGS. 13 and 14 to be mentioned below.

Now, an embodiment of a switched beam operation method in an OFDM/TDMA system and an OFDMA system will be explained in detail with reference to FIGS. 13 and 14.

The OFDM/TDMA system shown in FIG. 13 is a system in which a time slot is allocated to a mobile station so as to identify users. In this system, a significant interference between cells occurs in a cellular system since one mobile station uses a frequency band in its entirety.

Although interference signals can be removed by forming an adaptive beam in a cellular system employing a smart antenna, interference between cells may occur during an initial synchronization process using a switched beam. In such a case, a method for selecting beams in accordance with the present invention can be applied so as to prevent interference between cells.

FIG. 13 illustrates a downlink subframe 510 of an OFDM/TDMA system. A pair of a preamble 511 and broadcast information 512 positioned in a header of the downlink subframe 510, and a pair of a preamble 516 and broadcast information 517 positioned in an intermediate portion of the downlink subframe 510 are repeatedly transmitted using a switched beam selected by the method for selecting beams. Here, since the pair of preamble 511 and broadcast information 512, and the pair of preamble 516 and broadcast information 517 contain information different from each other, a method for selecting beams are performed in an independent fashion.

The downlink subframe 510 is transmitted from a base station, wherein the pair of the preamble 511 and broadcast information 512 contains data for uplink transmission of a mobile station and identical information is repeatedly transmitted using a switched beam so as to obtain space diversity.

A preamble 513 and broadcast information 514, and a downlink data symbol 515 shown after that are used for a specific mobile station and transmitted in a unicast method using an adaptive beam, wherein broadcast information 514 contains only information associated with the downlink data symbol 515 transmitted to the specific mobile station. A pair of preamble 516 and broadcast information 517 contains information of downlink data symbols 519 which are transmitted with a small interval, and identical information is transmitted using a switched beam. A preamble 518 exists in the head portion of the downlink data symbols 519; and the preamble 518 and the downlink data symbols 519 are transmitted using an adaptive beam.

Meanwhile, in an OFDMA system shown in FIG. 14, different subchannels are allocated to the mobile station, and a specific subchannel is allocated so as to transmit broadcast information.

FIG. 14 illustrate a downlink subframe 520 of an OFDMA system. A preamble 521 for synchronization exists in a head portion of the downlink subframe 520; and then a frequency band 523 for transmission of broadcast information and a frequency band 522 for transmission of data are separately allocated.

In the foregoing, the pair of the preamble 524 and broadcast information 525 is repeatedly transmitted using a switched beam, while data (downlink data symbol) are transmitted using an adaptive beam.

In particular, in case where bands for transmitting broadcast information are identical in an OFDMA system with a frequency reuse factor 1, the above-mentioned method for selecting beams is adopted for that band to thereby reduce interference between cells.

The method of the present invention as mentioned early may be implemented by a software program and stored in storage medium such as CD-ROM, RAM, ROM, floppy disk, hard disk, optical magnetic disk, etc., which are readable by a computer. This process may easily be carried out by those skilled in the art; and therefore, details of thereof are omitted here.

The present invention as mentioned above is advantageous in that interference can be reduced through a method for selecting beams between base stations during an initial synchronization process using a switched beam in an OFDM cellular system employing a smart antenna.

Moreover, the present invention enables an initial registration during a short time under a condition where interference with adjacent cells hardly occurs. This invention can be applied to a variety of systems such as an FDMA system, an FDD system, a mobile BWA system, etc., as well as a TDMA system and a TDD system, in consideration of various types of sectored cells and fixed beams. In addition, the present invention has effects of improving performance when switched beams operate in an OFDM/TDMA system, an OFDMA system, and so on.

The present application contains subject matter related to Korean patent application No. 2005-0041179, filed in the Korean Intellectual Property Office on May 17, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for selecting beams during an initial synchronization process using a switched beam in a radio communications system, the method comprising:
dividing each cell into sectors;
counting the number of fixed beams per cell, wherein the fixed beams have identical numbers in all cells;
selecting, for each sector, a sequence of switched beams from the fixed beams within that sector,
wherein the sequence of switched beams is calculated based on the number of fixed beams, sector numbers, frame numbers, the number of times of transmission of preamble in one frame, distances between the selected switched beams and selected switched beams of adjacent cells, and the number of beams to be selected in each time slot.

2. The method as recited in claim 1, wherein beams are selected in the corresponding sector according to the following equation 1 in consideration of various types of sectored cells and fixed beams, $$BN = PS[NoB \times SN + (FN \times N + [1:N] - 1)_{mod(NoB)} + 1] \quad \text{Eq. (1)}$$

Wherein BN denotes beam numbers, SN denotes sector numbers, FN denotes frame numbers, N indicates the number of times of transmission of preamble in one frame, NoB implies the number of fixed beams in a sector, set [1:N] denotes an integer sequence from 1 to N, operational sign $(.)_{mod(.)}$ denotes a residual operation, and sequence PS[.] is a sequence indicating the selection order of beams to be selected in each sector.

3. The method as recited in claim 2, wherein beams are selected in the corresponding sector according to the above equation 1 based on sequence of the following equation 2 in a case where eight fixed beams exist in each sector of two-sectored cells:

$$\{\text{Permutation Base}\} = \{1,2,3,4,5,6,7,8,9,12,11,10,15, 14,13,16\} \quad \text{Eq. (2)}.$$

4. The method as recited in claim 2, wherein beams are selected in the corresponding sector according to the above equation 1 based on sequence of the following equation 3 in a case where eight fixed beams exist in each sector of three-sectored cells:

$$\{\text{Permutation Base}\} = \{1,2,3,4,5,6,7,8,12,10,9,11,15, 14,16,13,19,18,20,17,23,21,22,24\} \quad \text{Eq. (3)}.$$

5. The method as recited in claim 2, wherein beams are selected in the corresponding sector according to the above equation 1 based on sequence of the following equation 4 in a case where four fixed beams exist in each sector of three-sectored cells:

$$\{\text{Permutation Base}\} = \{1,2,3,4,5,6,7,8,10,9,12,11\} \quad \text{Eq. (4)}.$$

6. The method as recited in claim 2, wherein beams are selected in the corresponding sector according to the above equation 1 based on sequence of the following equation 5 in a case where six fixed beams exist in each sector of three-sectored cells:

$$\{\text{Permutation Base}\} = \{1,2,3,4,5,6,9,7,8,12,10,11,14, 15,13,17,18,16\} \quad \text{Eq. (5)}.$$

7. The method as recited in claim 2, wherein beams are selected in the corresponding sector according to the above equation 1 based on sequence of the following equation 6 in a case where four fixed beams exist in each sector of four-sectored cells:

$$\{\text{Permutation Base}\} = \{1,2,3,4,5,6,7,8,10,9,12,11,14, 13,16,15\} \quad \text{Eq. (6)}.$$

8. A method for operating the switched beam selected by the method as recited in claim 1, wherein the method is implemented such that a base station repeatedly transmits a pair of a preamble and broadcast information of an orthogonal frequency division multiplexing/time division multiple access (OFDM/TDMA) downlink sub-frame to a mobile station, using the switched beam selected by the beam selecting method, in an OFDM/TDMA system where users are identified by allocating time slots to the mobile station, the pair of preamble and broadcast information with a certain gap being transmitted using a switched beam selected by an independent beam selection method, and data being transmitted using an adaptive beam.

9. A method for operating the switched beam selected by the method as recited in claim 1, wherein the method is implemented such that a frequency band for transmission of broadcast information and a frequency band for transmission of data are separately allocated, a base station repeatedly transmits a pair of a preamble and broadcast information of an OFDMA downlink subframe to a mobile station using the switched beam selected by the beam selecting method, and data are transmitted using an adaptive beam, in an OFDMA system where different subchannels are allocated to the mobile station and a predetermined subchannel for transmitting broadcast information is allocated to the mobile station.

10. The method as recited in claim 9, wherein the method for selecting beams with respect to bands is applied in a case where the bands for transmitting broadcast information are identical in an OFDMA system with a frequency reuse factor 1 such that the frequency reuse factor is a rate at which a same frequency can be used in the system.

11. An initial synchronization method using a switched beam selected by the method as recited in claim 1, wherein the method is implemented such that a base station selects one beam from among fixed beams for time slots in accordance with the beam selecting method, and transmits a preamble and broadcast information to an entire area or a predetermined area of a cell during a predetermined time slot when a downlink preamble and broadcast information are transmitted to an initial mobile station at a state where a position of mobile station or a weight vector is not acquired, to thereby allow the mobile station which has achieved a successive synchronization and acquisition of broadcast information to transmit a control symbol to the base station and then try a registration.

12. The initial synchronization method as recited in claim 11, wherein the base station receives the control symbol using one of a nondirectional beam, a switched beam, a fixed beam, or an adaptive beam in an uplink transmission.

13. The method as recited in claim 1, wherein each switched beam is selected to maintain a predetermined gap among the selected beams for preventing interference between cells caused due to superimposition between the selected beams and selected beams of adjacent cells.

14. The method as recited in claim 2, wherein the selected switched beams are selected from fixed beams per time slot, a preamble and broadcast information being transmitted to a whole area or a predetermined area of a cell during a predetermined time slot.

* * * * *